United States Patent [19]

Wehr et al.

[11] Patent Number: 4,540,033
[45] Date of Patent: Sep. 10, 1985

[54] CONTINUOUS TREE HARVESTER

[75] Inventors: Michael A. Wehr, Hancock; James A. Mattson, Laurium, both of Mich.

[73] Assignee: The United States of America as represented by the Secretary of Agriculture, Washington, D.C.

[21] Appl. No.: 579,919

[22] Filed: Feb. 14, 1984

[51] Int. Cl.³ .............................................. A01G 23/08
[52] U.S. Cl. .................................. 144/34 R; 144/3 D
[58] Field of Search ................. 144/3 D, 34 R, 34 E, 144/336, 335

[56] References Cited

U.S. PATENT DOCUMENTS

| | | | |
|---|---|---|---|
| 3,457,976 | 7/1969 | Anderssen et al. | 144/34 R |
| 4,050,488 | 9/1977 | Albright | 144/34 E |
| 4,153,086 | 5/1979 | Oldenburg | 144/34 R |
| 4,243,258 | 1/1981 | Dauwalder | 144/34 E |
| 4,313,479 | 2/1982 | Coughran, Jr. | 144/34 E |

FOREIGN PATENT DOCUMENTS 142493  7/1980  Netherlands ..................... 144/34 R Primary Examiner—W. D. Bray
Attorney, Agent, or Firm—M. Howard Silverstein; David G. McConnell

[57] ABSTRACT

A tree harvesting device which continuously severs and collects trees in a motion which is not governed by the motion of the carrier vehicle is described. The carrier vehicle moves from tree to tree in a continuous motion while the severing mechanism severs each tree in turn and then loads the cut trees into containment means within the harvester. Once the harvester is fully loaded, the containment mechanism releases and the harvester deposits the load in a bunched pile ready for subsequent handling and processing.

6 Claims, 12 Drawing Figures

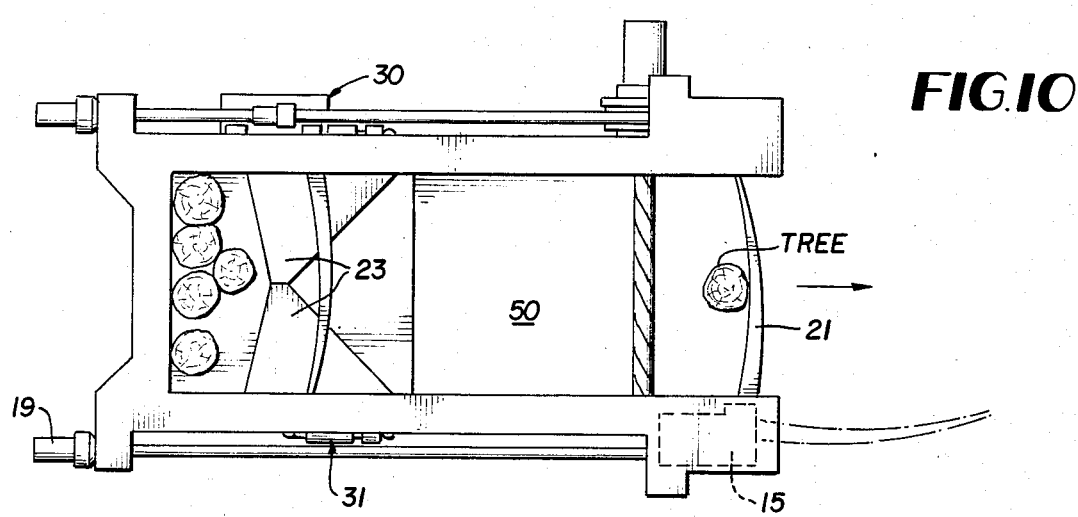
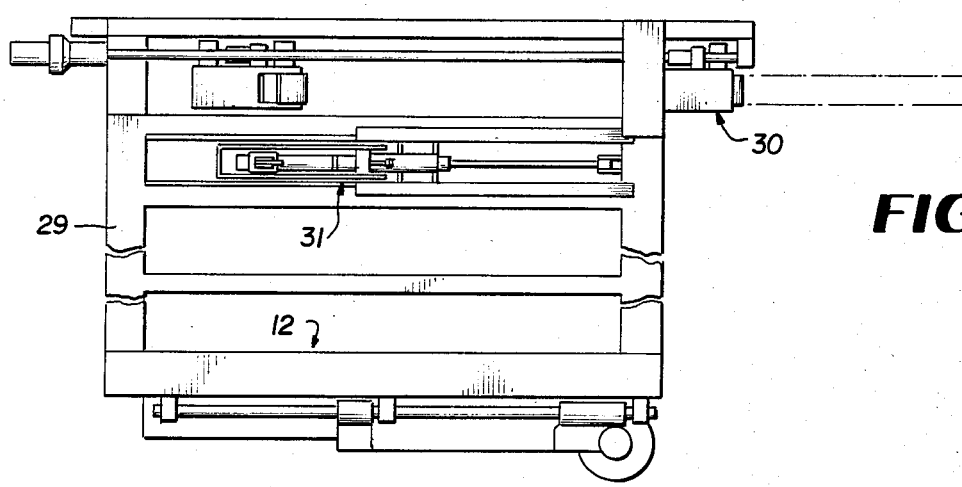
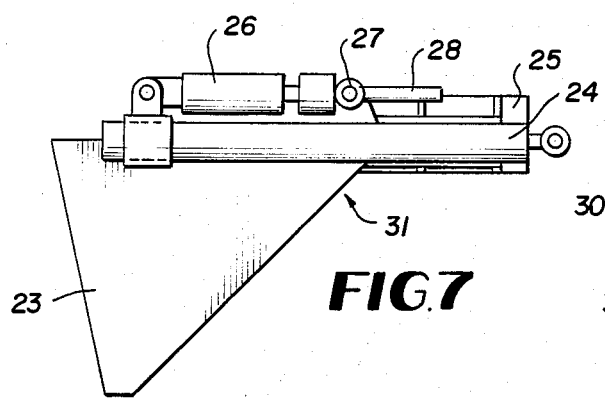
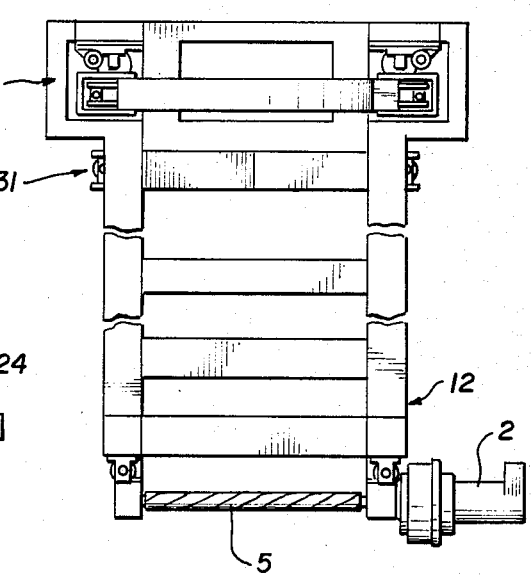
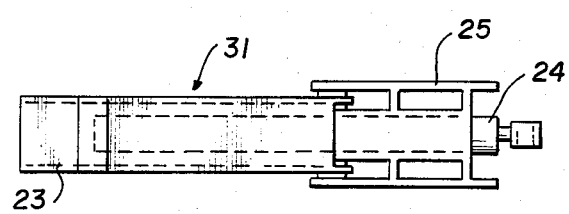

4,540,033

CONTINUOUS TREE HARVESTER

BACKGROUND OF THE INVENTION

This invention relates generally to a tree harvesting apparatus of the type that would be utilized in timber-stand improvement and plantation thinning and harvesting. Because of the increased costs of manual labor and other economic factors, a considerable amount of attention has recently been devoted towards the development of various types of mechanical tree harvesting devices to replace the conventional labor intensive methods of harvesting. Most mechanical harvesting devices rely heavily on a stop and go method of harvesting where the carrier vehicle must stop its motion during the severing phase. Once the severing is completed and the tree is placed on the ground. Preferably in bunches, the carrier can once again travel to its next tree to be harvested. While these new harvesters have eliminated a vast amount of the manual labor once required and have increased productivity, they are still not capable of continuous harvesting. Particularly in stands of small diameter trees, the productivity of available equipment is not high enough to make the harvesting operation economical. A large amount of the carrier vehicle's time is spent maneuvering before and after each severing operation. Many of these harvesters have incorporated an accumulating device which allows the harvester to sever and hold several trees before they are piled and bunched.

The present invention comprises a tree harvesting device which eliminates the need for the carrier vehicle to slow or stop and maneuver during and between each tree severing, and in addition, allows for the accumulation of large numbers of harvested trees. This process adapts extremely well to plantation stock where large numbers of trees are presented to the harvester in relatively uniform continuous rows. The invention harvesting device will increase the productivity of mechanized harvesting.

PRIOR ART

The following U.S. patents were developed during a prefiling novelty search prepared before the preparation and filing of the present application.

| | | | |
|---|---|---|---|
| 3,371,692 | Larson et al | 3,970,125 | Muirhead et al |
| 3,542,099 | Gibson | 4,153,086 | Oldenburg |
| 3,595,288 | Landers et al | 4,175,598 | Stoychoff |
| 3,612,117 | Kjell | 4,236,554 | Nicholson |
| 3,902,538 | Muirhead | 4,270,586 | Hyde et al |

SUMMARY OF THE INVENTION

The present harvesting apparatus is designed such that standing trees may be severed and collected while the vehicle supporting the harvester continues to be propelled forward at a steady rate. Unlike other harvesting devices, the severing action of the cutting mechanism requires, but the severing speed is not governed by, the forward motion of the harvester overall and its drive vehicle, if any. This feature allows the present apparatus to be severing one tree while simultaneously approaching the next.

More specifically, the invention contemplates supporting the severing mechanism in a normally forward or extended position in its carrier subframe. The cutter and subframe are operated such that as the carrier vehicle advances, the cutter severs the tree at a rate independent of the rate of ground speed of the carrier vehicle. The severing rate of the cutter is governed by the parameters of the cutter itself and of the particular tree, and not by the vehicle's forward motion. As the cutter severs the tree, the vehicle steadily advances towards the next tree. Once the cutter completes a cut, it automatically returns to its extended position and is ready for its next severing action. Meanwhile, the previously severed tree is drawn rearward into an accumulating device. This sequence is repeated until the accumulator is fully loaded at which time the load is then discharged onto the ground a pile for further processing.

The apparatus of the invention consists of two distinct devices. The first is the severing head subassembly which is mounted to the bottom of the second device, and the second is the accumulating subframe with associated mechanisms. The drive vehicle per se is not part of the invention, but of course a suitable vehicle is needed for its operation. The harvester and the vehicle could also be integrated into a self propelled machine.

BRIEF DESCRIPTION OF THE DRAWINGS

FIG. 7 is a top plan view of the accumulator clamp sub-assembly forming part of the accumulator subframe;

FIG. 8 is a side elevational view of the accumulator clamp sub-assembly;

FIG. 10 is a top plan view of the assembled together invention tree harvester;

FIG. 11 is a side elevational view thereof; and

FIG. 12 is a front elevational view thereof looking from the right hand side of FIGS. 10 and 11.

DETAILED DESCRIPTION OF THE PREFERRED EMBODIMENT

Figure 1:
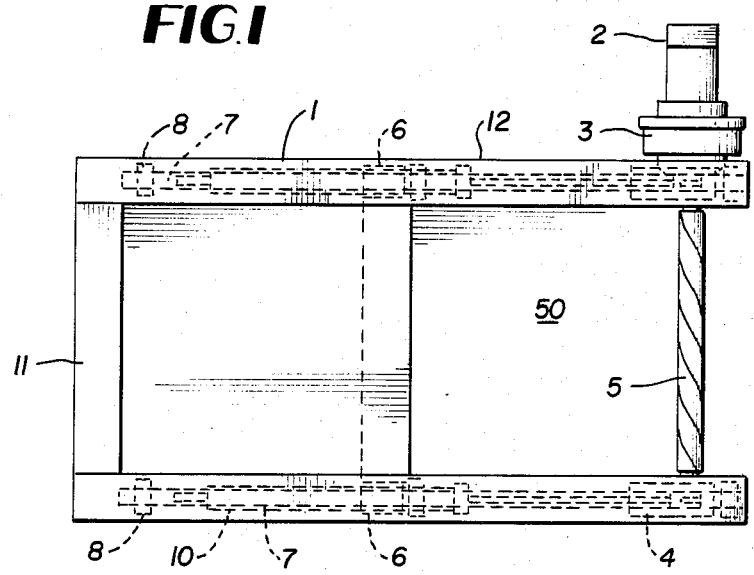
FIG. 1 is a top plan view of the severing head subassembly.
Figure 2:
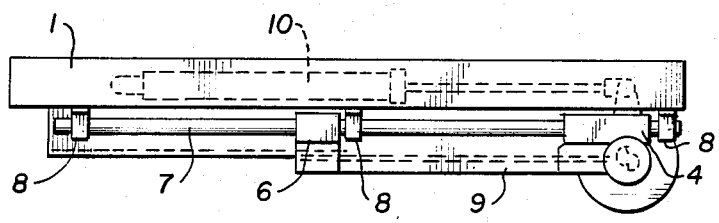
FIG. 2 is a side elevational view thereof.
Figure 3:
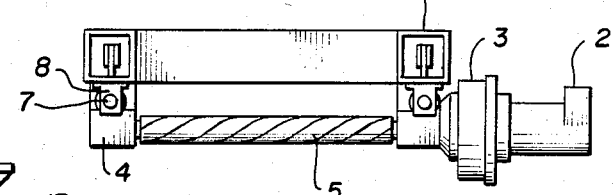
FIG. 3 is a front elevational view thereof looking from the right side of FIGS. 1 and 2.

FIGS. 1, 2 and 3 show the severing head sub-assembly which is designated by the reference numeral 12, and which includes a stationary frame 1 and a moving frame 9. The stationary frame 1 is composed of a U shaped structure with the front being the opening of the U. Fixed to the structure on the rear portion is a drop pan onto which the cut trees will be placed when accumulated.

The moving frame 9 is supported on the bottom of the stationary frame 1. The support arrangement provides for controlled and guided movement of the moving frame. Attached to each side of the moving frame is a front bearing support 4 and rear bearing support 6. These supports contain suitable low friction bearings and guide the moving frame along the guide shafts 7. Each guide shaft is connected to the stationary frame with three fixed guide shaft supports 8. The front bearing supports 4 also contain means for supporting the auger cutter 5 and flywheel and housing 3. An hydraulic motor 2 is bolted to the outboard side of flywheel housing and drives the flywheel through a keyed connection. Motor 2 may be driven from a prime mover (not shown) by suitable hose or the like means (not shown). The flywheel 3 is likewise connected to the auger cutter 5. Directly to the rear of the cutter 5 is a shelf 50 which is an integral part of the moving frame 9 and provides support to the trees after they are cut and are in the process of being transferred to the accumulation means, as described below. Additionally, the moving frame 9 is connected to the stationary frame 1 by means of a pair of cushion cylinders 10. The air pressure in the cushion cylinders is maintained at a fairly constant value by the air reservoir 11 which is formed by the base or cross-piece section of the stationary frame 1.

Figure 6:
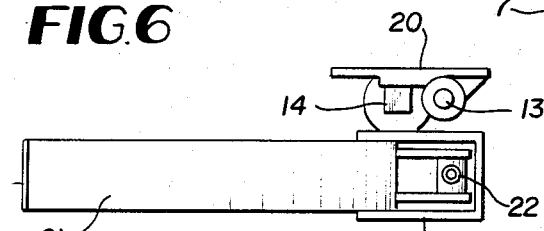
FIG. 6 is a front elevational view thereof looking from the right hand side of FIGS. 4 and 5.
Figure 4:
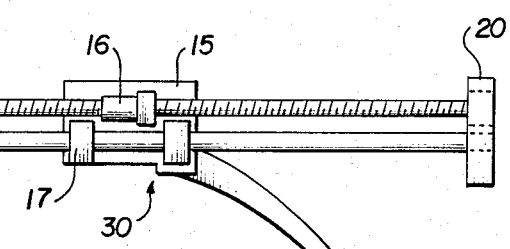
FIG. 4 is a top plan view of the gathering sub-assembly forming part of the accumulating subframe.
Figure 5:
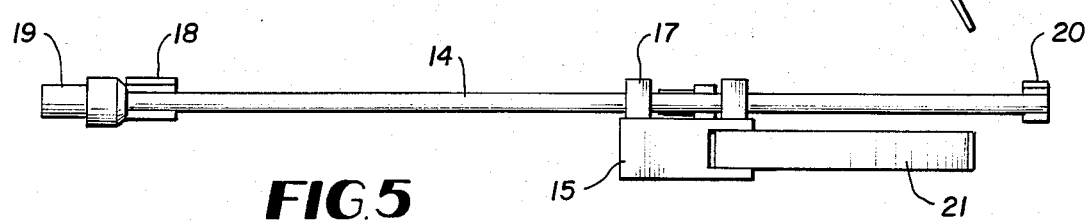
FIG. 5 is a side elevational view of the gathering sub-assembly.

FIGS. 4, 5 and 6 show the gathering sub-assembly 30 which is supported from the accumulating subframe by the rear support 18 and the front support 20. Each support secures and locates a main drive screw 13 and a guide bar 14. Additionally, mounted to the rear support 18 is a hydraulic drive motor 19 which rotates each main drive screw 13. These motors 19, like motor 2, may be driven from the prime mover by means not shown. Suspended from the guide bar 14 by unique low friction linear bearings 17 and driven by the drive screw 13 through the main ball nut 16 is the housing 15. The housing contains the arm driving mechanism 22 which swings the gathering arm 21 through a 90 degree arc.

Figure 9:
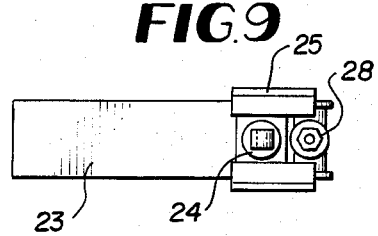
FIG. 9 is a front elevational view thereof looking from the right hand side of FIGS. 7 and 8.

FIGS. 7, 8 and 9 show one of the pair of the accumulation clamp sub-assemblies 31, each of which consists of an accumulation gate 23 that is pivoted on the gate positioner guide 25. Gate actuator 26 swings the gate in or out by stroking the gate pivot actuator. Spring assembly 28 allows the gate to swing out under load.

FIGS. 10, 11 and 12 show the assembled harvesting device which comprises a severing head sub-assembly 12, two gathering sub-assemblies 30, two accumulator clamp sub-assemblies 31 and the main frame 29. The harvester may be supported from and driven by various types of vehicles ranging from medium sized farm tractors to crawler type tractors. The major requirement is that adequate power to operate the harvesters functions be available on the prime mover. The invention harvester's operation will be substantially the same regardless of the source of power. Suitable means are provided to attach the invention harvester to the prime mover with both mechanical and hydraulic connections, as is well known to those skilled in these arts. Alternatively, the invention harvester can be made into a self-contained, self-propelled vehicle.

OPERATION

As the harvester moves towards a tree to start severing, several things occur or have already taken place after the previous tree was cut. The moving frame assembly which consists of the moving frame 9, front and rear bearing support 4 and 6, the flywheel and housing 3 and the hydraulic motor 2 will have advanced to its outer-most position due to the pressure in the air cylinders 10. This position is as shown in FIGS. 1 and 10. Secondly, one of the two housing assemblies of the gathering sub-assembly system consisting of the housing 15, main ball nut 16, guide bearing 17, gathering arm 21 and arm drive mechanism 22 is driven to its most forward position by the hydraulic drive motor 19 and main drive screw 13, as represented by the dashed lines in FIG. 10. The arm driving mechanism 22 positions the arm fully extended.

When the harvester has advanced close enough for the auger cutter 5 to engage with the tree and start cutting, the extended gathering arm 21 rotates 90 degrees to a closed position so that the arm is positioned on the back side of the tree. While the harvester is moving forward the auger cutter/moving frame assembly is steadily advancing through the tree. Because of the variation between auger severing rate and the harvester ground speed, the moving frame 9 appears to back up or retract with respect to the harvester's main frame while in reality it is also moving forward, but at a slower rate. The cushion cylinders 10 and air reservoir 11 provide the constant force necessary for the auger 5 to cut effectively yet allow for the necessary relative motion between the harvester main frame and the moving frame assembly.

As the auger 5 mills its way through the tree and removes that last portion necessary for it to stand alone, the tree will then sit on top of the auger cutter. At this instant, because of the direction of rotation, the auger directs the tree butt rearwards into the harvester. At this same time the gathering arm 21 which had closed around the back side of the tree moves towards the rear of the harvester drawing the tree with it.

During the forementioned sequence the opposite side gathering system arm has extended and has moved to the front of the harvester into a position similar to that at the start of the present cycle, but on the opposite side, the top looking at FIG. 10. Means are provided in the moving main housing 15 of the gathering sub-assembly 30 to cause the gathering arm 21 to automatically move from the operative solid line position shown in FIG. 10 to the inoperative dashed line position of FIG. 10 at both ends of the travel of the head 15 on its respective main drive screw 13. Likewise, means to reverse the direction of operation of the motor 19 is also provided at the ends of operation. Such arrangements, including manual override and manual controls, are well known to those skilled in the arts of hydraulics and related arts to the invention harvester.

As the first arm 21 draws the severed tree rearwards in the harvester, the tree will be guided into the vee formed by the forward surfaces of the accumulator gates 23. When the tree is in this proximate location, the gate positioning cylinders 24 will move swiftly forward. The vee formed by the gates will separate and spring around to the back side of the tree. The positioning cylinders will then move the gates rearwards, thus holding the newly severed tree along with previously severed trees in the containment or accumulating section. The gathering arm then extends and moves towards the front of the harvester thus completing the cycle.

Meanwhile, the opposite side system has captured a severed tree and is duplicating the sequence. Once the containment area is filled, the load is dumped into a pile by raising and tipping the harvester forward, the accumulator gates are swung outward by the gate pivot actuator 27 and the load is released.

While the invention has been described above in the context of severing a single tree, it can be seen that more than one tree, especially where relatively smaller stems are involved, can be severed. This feature, that is the ability to sever more than one stem at a time, makes the invention particularly attractive for plantation type harvesting of trees, that is in a controlled growing environment.

Further, another important feature is that the apparatus is automatically triggered when it engages a tree. This is accomplished by the various means described above contained in the various control mechanisms. Another advantage is that the invention severing device does not necessarily have to be exactly in line with the tree to be felled, so long as that tree is within the width of the apparatus, that is can be taken in as the apparatus moves forwardly. In that regard, it is another feature of the invention that it can be used with many different kinds of prime movers, and it can be in the nature of an attachment, or in the form of a self-contained machine.

The automatic accumulating is particularly attractive when harvesting plantations of small trees, in that the harvesting operation can proceed without having to stop, because of the automatic accumulation of the cut stems.

The invention device provides a multi-part apparatus, wherein the speed of severing is independent of the ground speed of the vehicle, by permitting relative motion to occur between severing device and the main body of the harvester. In this manner, continuous and constant harvester speed can be maintained, while at the same time cutting relatively larger numbers of relatively smaller trees, or vice-versa, up to the capacity of the accumulation means.

While the invention has been described in detail above, it is to be understood that this detailed description is by way of example only, and the protection granted is to be limited only within the spirit of the invention and the scope of the following claims.

What is claimed is:

1. A tree harvester adapted to move forward over the ground at a preselected rate of speed, comprising support means and tree severing means, means to mount said tree severing means on said support means for relative motion of said tree severing means with respect to said support means, and said mounting means comprising means to permit said severing means to move with respect to said support means to a speed independent of the speed of motion of said support means moving at said preselected rate of speed;

said harvester further including accumulation means adapted to accumulate severed trees as said harvester moves forward through a stand of trees, whereby said harvester can sever and accumulate a plurality of trees up to the capacity of said accumulation means without stopping its motion through said stand of trees;

said harvester being of generally "U" shaped configuration, the open end of said "U" being positioned to face forwardly with respect to the direction of motion of said harvester through a stand of trees to be severed, said accumulation means being located in the vicinity of the closed end of said "U" shaped configuration of said harvester, said severing means comprising tree milling auger means, means to position said auger means in closely space relation to said open end of said harvester, and means to mount said tree gathering means on said harvester in such a manner as to permit said tree gathering means to guide a tree to be severed into said auger means and to permit said auger means together with said gathering means to move with respect to the remainder of said harvester and with respect to said accumulation means;

said gathering means comprising a pair of arms mounted one on each side of said "U" shaped configuration of said harvester, means to permit motion of said arms from the front end of said "U" shaped harvester past said auger means and to said accumulation means independently of each other, whereby one of said pair of arms can be delivering at least one severed tree to said accumulation means while the other of said pair of arms is beginning to feed a tree to said auger means.

2. The tree harvester of claim 1, wherein each of said arms is independently movable with respect to the other by means of respective lead screw means, and separate control means for controlling the operation of each of said arms with respect to said harvester and to permit each of said arms to open to permit entry of a tree to be severed into the open "U" shaped opening at the front end of said harvester and to close said arm at the front end around said tree and to permit said arm to open after said arm has delivered a cut tree to said accumulation means, and each of said arms having an opened position wherein it is positioned substantially parallel to the legs of said "U" shaped harvester, and a closed position wherein each of said arms extends across the opening of said "U" shaped harvester.

3. The tree harvester of claim 1, wherein said accumulation means includes a pair of accumulator gates, said gates being symmetrically configured and of generally truncated triangular shape, said gates having their bases respectively connected to the sides of said "U" shaped harvester and their truncated points in closely spaced relation to each other, the sides of the pair of gates facing forwardly with respect to the direction of motion of said harvester through a stand of trees to be severed thus forming feed means to guide a severed tree coming in contact therewith into the area at the trunicated points of said pair of gates, said gathering means to move said gates apart when a severed tree is urged and moved past said gates by said gathering means, and means to permit said accumulator gates to temporarily separate to permit the passage of said severed tree therethrough and to thereafter cause said accumulator gates to come together again on the back side of said tree to thereby accumulate severed trees in said accumulator means.

4. The tree harvester of claim 3, said accumulation means comprising resilient means adapted to normally hold said gates together and to cause said gates to spring back together after said gathering means has forced a severed tree past said gates.

5. A tree harvester adapted to move forward over the ground at a preselected rate of speed, comprising support means and tree severing means, means to mount said tree severing means on said support means for relative motion of said tree severing means with respect to said support means, and said mounting means comprising means to permit said severing means to move with respect to said support means at a speed independent of the speed of motion of said support means moving at said preselected rate of speed;

said means to mount said severing means with respect to said support means comprising a movable frame member supporting said severing means and movable relative to said support means, said movable frame member being connected to said support means through bearing supports; said means to mount said severing means with respect to said support means further comprising cushion cylinder means to urge said severing means against a tree being cut, said cylinder means including piston means, said piston means being infinitely variably movable with respect to said cylinder means between a fully extended position and a fully retracted position, means to mount said severing means at the outer end of said piston means, means to position said piston means in said fully extended position with respect to said cylinder means prior to engagement of said severing means with a tree, whereby said piston means can move into said cylinder means under the control of the pressure in said cushion cylinder means as said harvester moves over the ground to permit said severing means to cut and advance into said tree in the forward direction at a speed controlled by the cutting action rather than at a speed controlled by the ground speed.

6. A tree harvester according to claim 5 further including accumulation means adapted to accumulate severed trees as said harvester moves forward through a stand of trees, whereby said harvester can sever and accumulate a plurality of trees up to the capacity of said accumulation means without stopping its motion through said stand of trees; said harvester being of generally "U" shaped configuration, the open end of said "U" being positioned to face forwardly with respect to the direction of motion of said harvester through a stand of trees to be severed, said accumulation means being located in the vicinity of the closed end of said "U" shaped configuration of said harvester, said severing means comprising tree milling auger means, means to position said milling auger means, means to position said auger means in closely space relation to said open end of said harvester, and means to mount said tree gathering means of said harvester in such a manner as to permit said tree gathering means to move with respect to said auger means to feed a tree to be severed into said auger means and to permit said auger means together with said gathering means to move with respect to the remainder of said harvester and with respect to said accumulation means.

* * * * *